United States Patent

Althausen et al.

Patent Number: 6,065,862
Date of Patent: May 23, 2000

[54] HIGH-PRESSURE MIXING HEAD

[75] Inventors: Ferdinand Althausen, Neunkirchen-Seelscheid; Jürgen Wirth, Köln; Florian Thiebes, Königswinter, all of Germany

[73] Assignee: Hennecke GmbH, Leverkusen, Germany

[21] Appl. No.: 09/214,188

[22] PCT Filed: Jul. 1, 1997

[86] PCT No.: PCT/EP97/03442

§ 371 Date: Dec. 30, 1998

§ 102(e) Date: Dec. 30, 1998

[87] PCT Pub. No.: WO98/01274

PCT Pub. Date: Jan. 15, 1998

[30] Foreign Application Priority Data

Jul. 4, 1995 [DE] Germany ............ 196 26 918
Jan. 24, 1997 [DE] Germany ............ 197 02 434

[51] Int. Cl.[7] ................ B01F 5/04; B01F 15/02
[52] U.S. Cl. .................. 366/162.5; 422/133
[58] Field of Search ............. 366/138, 159.1, 366/162.4, 162.5, 167.1, 173.1; 422/133–135

[56] References Cited

U.S. PATENT DOCUMENTS

| | | |
|---|---|---|
| 3,975,128 | 8/1976 | Schluter . |
| 4,332,335 | 6/1982 | Fiorentini . |
| 4,721,602 | 1/1988 | Woitzel ............... 422/133 |
| 4,775,517 | 10/1988 | Sulzbach ............. 422/133 |
| 4,809,909 | 3/1989 | Kukesh . |
| 4,898,714 | 2/1990 | Urban et al. . |
| 5,157,059 | 10/1992 | Bauer et al. . |
| 5,186,388 | 2/1993 | Chapman et al. . |
| 5,270,014 | 12/1993 | Bauer et al. ........ 366/159.1 |

FOREIGN PATENT DOCUMENTS

| | | | |
|---|---|---|---|
| 59-201828 | 11/1984 | Japan ............ 366/162.5 |
| 96/35562 | 11/1996 | WIPO . |

*Primary Examiner*—Charles E. Cooley
*Attorney, Agent, or Firm*—Joseph C. Gil; Noland J. Cheung

[57] ABSTRACT

The present invention relates to a high-pressure mixing head for mixing at least two reactive plastic components, containing a mixing chamber, into which there lead two injection nozzles arranged opposite one another for the components, a proportioning piston which is displaceable in the mixing chamber and a settling and outflow chamber with a cleaning slide extending substantially perpendicular to the axis of the mixing chamber, characterized in that the settling chamber and the cleaning slide have a substantially rectangular cross-section with an axial ratio from 10 to 100. The axial ratio is defined as the ratio of the width of the settling chamber and the cleaning slide to the thickness of the settling chamber and cleaning slide.

6 Claims, 4 Drawing Sheets

HIGH-PRESSURE MIXING HEAD

FIELD OF THE INVENTION

The present invention relates to a high-pressure mixing head for mixing at least two reactive plastic components, in the case of which components the mixture emerges from the mixing head in the form of a curtain.

BACKGROUND OF THE INVENTION

Mixing heads for two-component plastics are known in which the components are injected under high pressure through injection nozzles located opposite one another into a cylindrical mixing chamber, the mixture is transferred from the mixing chamber into a settling chamber arranged at a right angle to the mixing chamber and is subsequently charged, for example in free-flowing manner, into open molds (see DE-A 29 07 938). In this case axially displaceable cleaning pistons and ejection pistons are provided both in the mixing chamber and in the settling chamber, which, after the filling of a mold has been concluded—ie, at the end of the shot, are axially displaced so that they fill out the respective chambers. The mixing-chamber cleaning piston comprises longitudinal grooves located opposite one another which in the piston position sealing the mixing chamber cover the injection nozzles and establish a connection to return lines for the components.

A reduction in the turbulence prevailing in the mixture is intended to take place in the settling chamber, so that emission of the mixture from the settling chamber takes place in laminar manner.

Now, it has been shown that, particularly in the case of mixing heads for relatively large throughputs of the two-component mixture, in the case of which the diameter ot the settling chamber is designed to be correspondingly large, only an inadequate reduction of turbulence takes place, so that the stream of the mixture flowing out has a tendency to fan out. With a view to avoiding a fanned outflow stream the settling chamber has to be disproportionately extended in the axial direction.

SUMMARY OF THE INVENTION

In accordance with the invention it is now proposed to provide the outflow chamber with a substantially rectangular cross-section.

The present invention provides a high-pressure mixing head for mixing at least two reactive plastic components in particular the components of a polyurethane reactive mixture, said mixing head containing a mixing chamber with proportioning piston, into which there lead two injection nozzles arranged opposite one another for the components, said mixing chamber leading into a settling chamber with cleaning slide, said settling chamber extending in substantially rectangular manner in relation to the axis of the mixing chamber, said mixing head being characterized in that the settling chamber and the cleaning slide have a substantially rectangular cross-section with an axial ratio from 10 to 100. The axial ratio is defined as the ratio of the width of the settling chamber and the cleaning slide to the thickness of the settling chamber and the cleaning slide.

The component mixture accordingly emerges from the mixing head in the form of a curtain with a breadth or width that is 10 to 100 times greater than its thickness.

The settling chamber and the cleaning slide should preferably have a substantially rectangular cross-section with an axial ratio from 15 to 80, in particularly preferred manner from 25 to 60.

The settling chamber is accordingly formed by two parallel boundary surfaces with a small spacing, whereby the spacing may amount to approximately 1 to 10 mm. By reason of the small spacing of the boundary surfaces a rapid and effective reduction of turbulence takes place in the flowing component mixture.

The mixing chamber opens, preferably in perpendicularly centric manner, through one of the large boundary surfaces of the settling chamber. The large lateral dimension of the settling chamber may amount to 2 to 8 times, in particularly preferred manner at least 3 times, the diameter of the mixing chamber.

The high-pressure mixing head according to the invention not only guarantees excellent settling of the component mixture but furthermore permits the rate of flow of the mixture to be controlled within wide ranges. For instance, the speed of discharge of a polyurethane reactive mixture from the settling chamber may, for example, be varied without disadvantage in the range between 0.25 and 5 m/sec, in the case of particularly high viscosities of the mixture even up to 10 m/sec.

Furthermore, by the provision of the stream of mixture in the form of a broad curtain, uniform charging into open molds is possible without the risk of gas occlusions. To this end the mixing head is moved back and forth over the mould in traversing manner.

In particularly preferred manner the high-pressure mixing head according to the invention can be employed for the production of two-component plastics filled with solids. In this case, solids are impelled laterally against the curtain of the component mixture which flows freely after emerging from the settling chamber.

The invention accordingly also provides a process for the production of two-component plastics filled with solids, wherein the components are mixed in a high-pressure mixing head with connected settling chamber, said process being characterized in that the settling chamber has a substantially rectangular cross-section with an axial ratio from 10 to 100 so that the mixture emerges from the settling chamber in the form of a free-flowing curtain and the solids are impelled against the curtain.

An appropriate device for implementing this preferred process for the production of filled two-component plastics comprises, in addition to the mixing head below the outlet opening of the settling chamber, a device for the directed supply of solids.

By way of solids, use may be made of solids that are known as reinforcing agents or flameproofing agents in powder, granulate, flake or fibre form, in particular those having an extent in at least one dimension of at least 0.2 mm, preferably at least 0.5 mm.

The device according to the invention and the process according to the invention are suitable in particular for those solids, incorporation of which in accordance with other processes causes difficulties by reason of their mechanical sensitivity. For example, in accordance with the invention it is possible for exfoliated graphite to be incorporated into polyurethanes as a flameproofing agent.

By way of exfoliated graphite, known intercalation compounds of $SO_x$, $NO_x$, halogen and/or strong acids in graphite enter into consideration, for example. These are also designated as graphitic salts. Preferred are exfoliated graphites that, subject to bloating at temperatures from, for example, 120 to 350° C., give off $SO_2$, $SO_3$, NO and/or $NO_2$. The exfoliated graphite may, for example, be present in the form of flakes having a maximum diameter in the range from 0.1 to 5 mm. This diameter preferably lies in the range from 0.5 to 3 mm. Exfoliated graphites that are suitable for the present invention are commercially available.

Relative to the ready-to-use fire-protection element, 1 to 50 wt-%. For example, of exfoliated graphite may be contained therein. This content of exfoliated graphite is preferably around 2 to 30 wt-%. in particular around 2 to 20 wt-%. The effect of the exfoliated graphite as a flameproofing agent is tied to the size of the graphite particles. Particles of exfoliated graphite that are ground into a binding agent during the incorporation process only contribute to the flame-resistant impregnation to a very limited extent. Conventional processes for the incorporation of fillers into polyurethane reactive mixtures result in a considerable diminution of the particle size, which is detrimental to the flame-resistant impregnation.

The solid particles are supplied to the liquid curtain by means of a suitable transport unit in which the necessary kinetic energy is imparted to the particles. In this connection a transport gas, preferably air, may be used for support.

The invention is furthermore outstandingly suitable for the production of fibre-reinforced polyurethanes, particularly if the fibres have a length that is no longer manageable with other incorporation processes.

By way of reinforcing fibres, use may be made of natural or synthetic, organic or inorganic fibres, the invention being suitable in particular for fiber lengths from 3 to 300 mm.

In particularly preferred manner use is made of glass fibers.

In this case the glass fibers are preferably supplied in the form of a glass-fiber hank, are conveyed and cut by means of transport rollers and cutting rollers and are impelled against the free-flowing two-component mixture. The glass fibers may have a length of, for example, 10 to 100 mm.

The solids are preferably impelled at an angle of 40 to 90°, in particularly preferred manner at an angle of 40 to 60°, against the component-mixture curtain.

The mixing head according to the invention can be employed for the purpose of charging the polyurethane reactive mixture into open molds, optionally jointly with solids. Furthermore, the mixing head is suitable for the continuous production of open-cell or closed-cell block foam, in which connection the curtain of the reactive mixture is applied onto the lower conveyor belt of the continuous mold of a block-foam plant. The mixing head is preferably arranged above the conveyor belt in such a way that the curtain points in the direction of motion of the conveyor belt, the mixing head being moved back and forth at right angles to the conveyor belt.

In accordance with the invention use may furthermore be made of combinations of solids, by the curtain of the reactive mixture having glass fibers applied to it from one side, for example and having exfoliated graphite applied to it from the other side.

The invention is elucidated in more detail below on the basis of FIGS. 1 to 6.

DETAILED DESCRIPTION OF THE INVENTION

Figure 2:
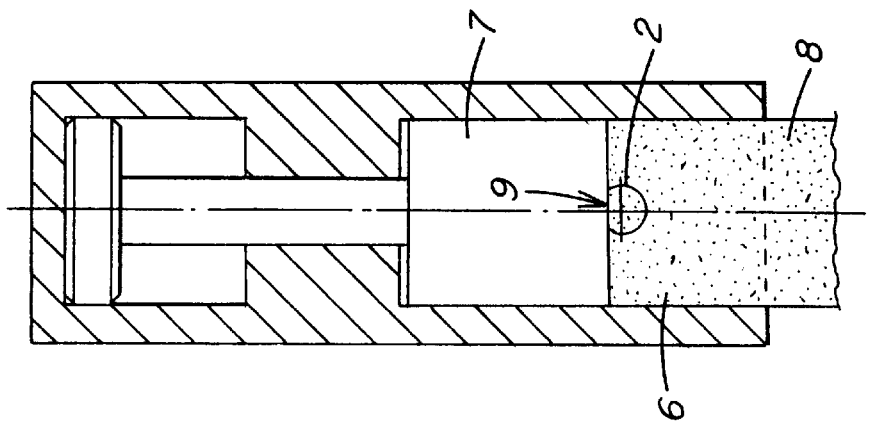
FIG. 2 shows a section 2—2 through the mixing head according to FIG. 1
Figure 1:
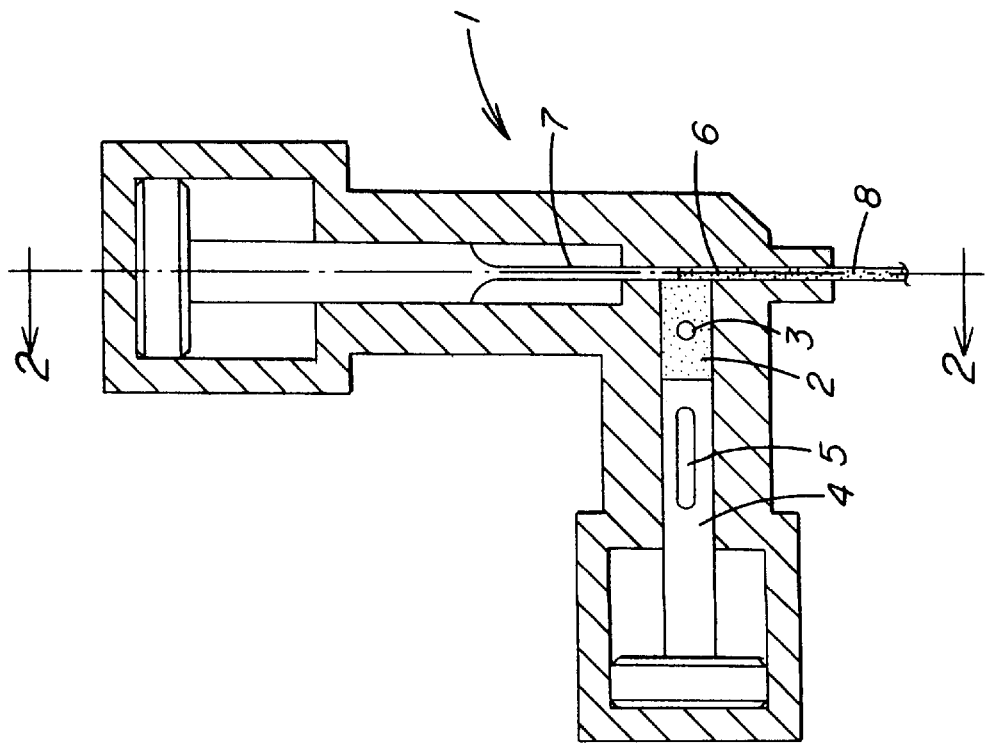
FIG. 1 shows a cross-section through a high-pressure mixing head according to the invention

FIGS. 1 and 2 show a high-pressure nixing head 1 according to the invention with a cylindrical mixing chamber 2, into which there lead two injection nozzles 3 located opposite one another for the two components of the mixture—in the case of polyurethane, the components isocyanate and polyol. The proportioning piston 4 is arranged in the axis of the mixing chamber so as to be hydraulically displaceable. The mixing piston 4 comprises two grooves 5 located opposite one another which ill the closure position each connect an injection nozzle 3 to the respective return line, which is not represented. The mixing head comprises, at right angles to the mixing chamber 2, a settling chamber 6 of substantially rectangular cross-section, so that the component mixture emerges from the mixing head in the form of a curtain 8.

Furthermore, a cleaning piston 7 which is hydraulically displaceable in the direction of the outlet of the settling chamber is provided which in the operating position releases the mixing-chamber outlet to the settling chamber 6 and partially covers it in restricting manner (9). The ratio of the width of the settling chamber and the cleaning slide to the thickness of the settling chamber and the cleaning slide is 10 to 100.

Figure 3:
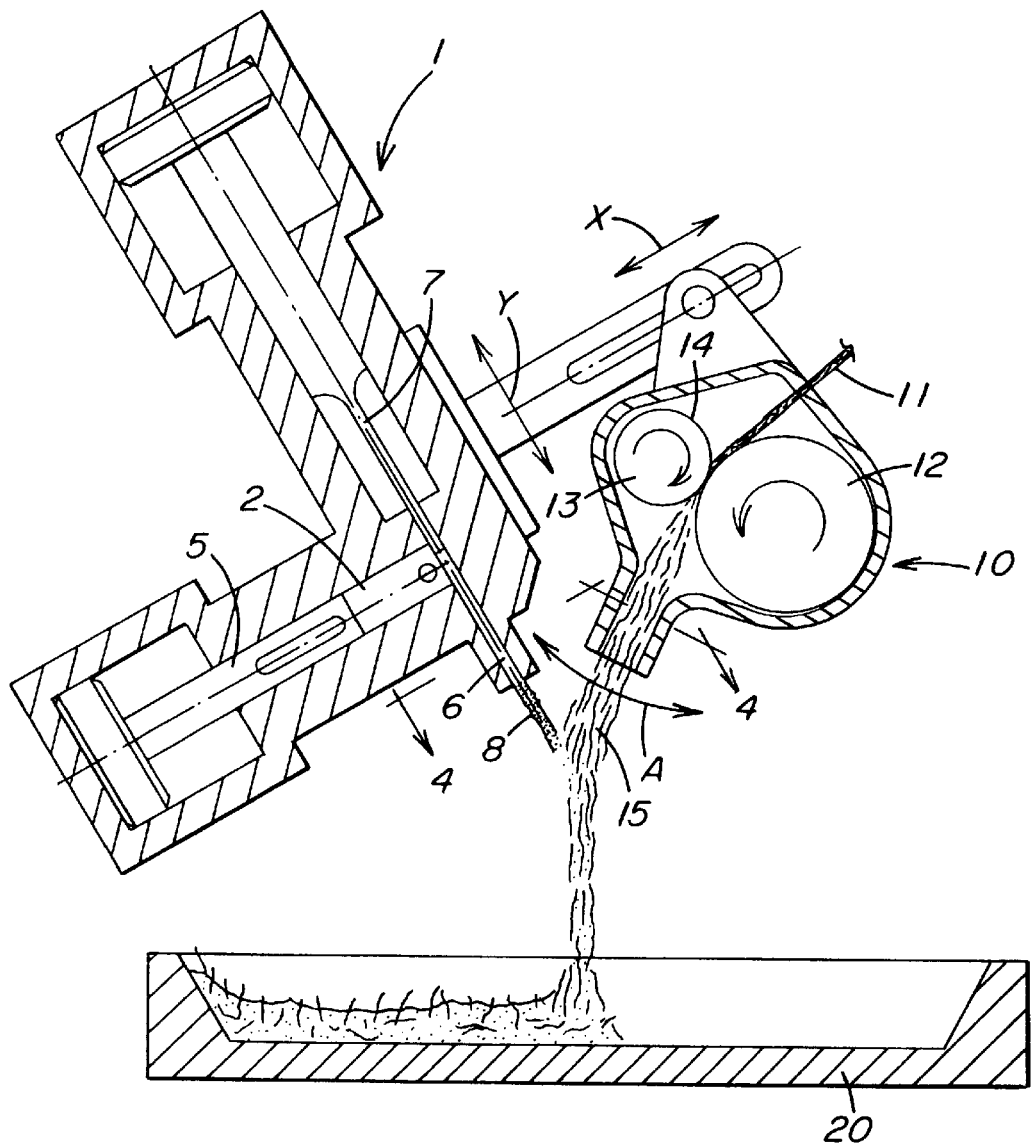
FIG. 3 shows a device according to the invention for the production of polyurethane mouldings reinforced with glass fiber

FIG. 3 shows a high-pressure mixing head 1 according to the invention, from which the component mixture 8 emerges. Against the curtain 8 there are impelled glass fibers 15 which are conveyed and cut by feeding one or more glass-fiber hanks 11 between a transport roller 12 and a cutting roller 13, on the circumferential surface of which at least one cutter blade 14 is attached in axially parallel manner. The surface speed of the transport roller 12 and of the cutting roller 13 may amount to between 1 and 50 m/sec, preferably 3 to 10 m/sec. The impelling device 10 for the glass fiber is connected to the high-pressure mixing head 12 in adjustable manner in the directions X and Y and about an angle a. By reason of the speed imparted to them by the transport roller 12 and the cutting roller 13 the glass fibers 15 are shot into the curtain 8 and wetted by the component mixture. The mix consisting of component mixture and glass fibers is introduced into the open mold-half 20, the high-pressure mixing head being moved horizontally over the mold 20. After the mold has been filled, the mixing chamber 2 is sealed by the proportioning piston 5 and the remaining component mixture is expelled from the settling chamber 6 by means of the cleaning slide 7. Subsequently the lower mold-half 20 is closed by an upper mold-half, which is not represented, by means of a suitable closing device and the component mixture is hardened.

Figure 4:
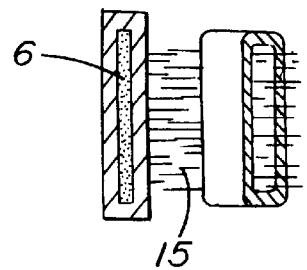
FIG. 4 shows a section 4—4 through the representation according to FIG. 3

FIG. 4 shows a section 4—4 through the representation according to FIG. 3.

Figure 5:
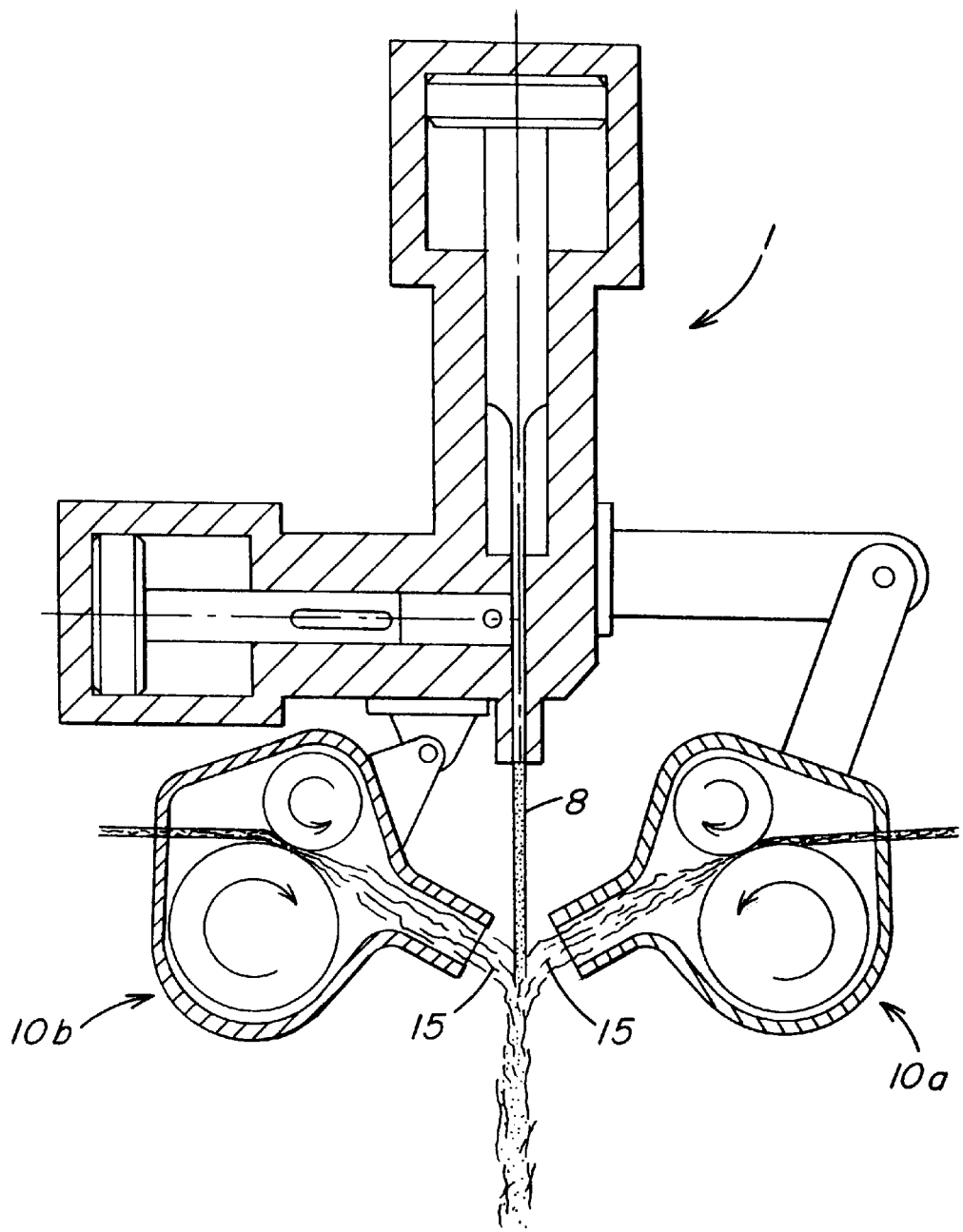
FIG. 5 shows another device for the production of multi-component plastics reinforced with glass fiber

FIG. 5 shows a particularly preferred embodiment of the invention, wherein glass fibers 15 are applied to the mixture curtain 8 from both sides.

Figure 6:
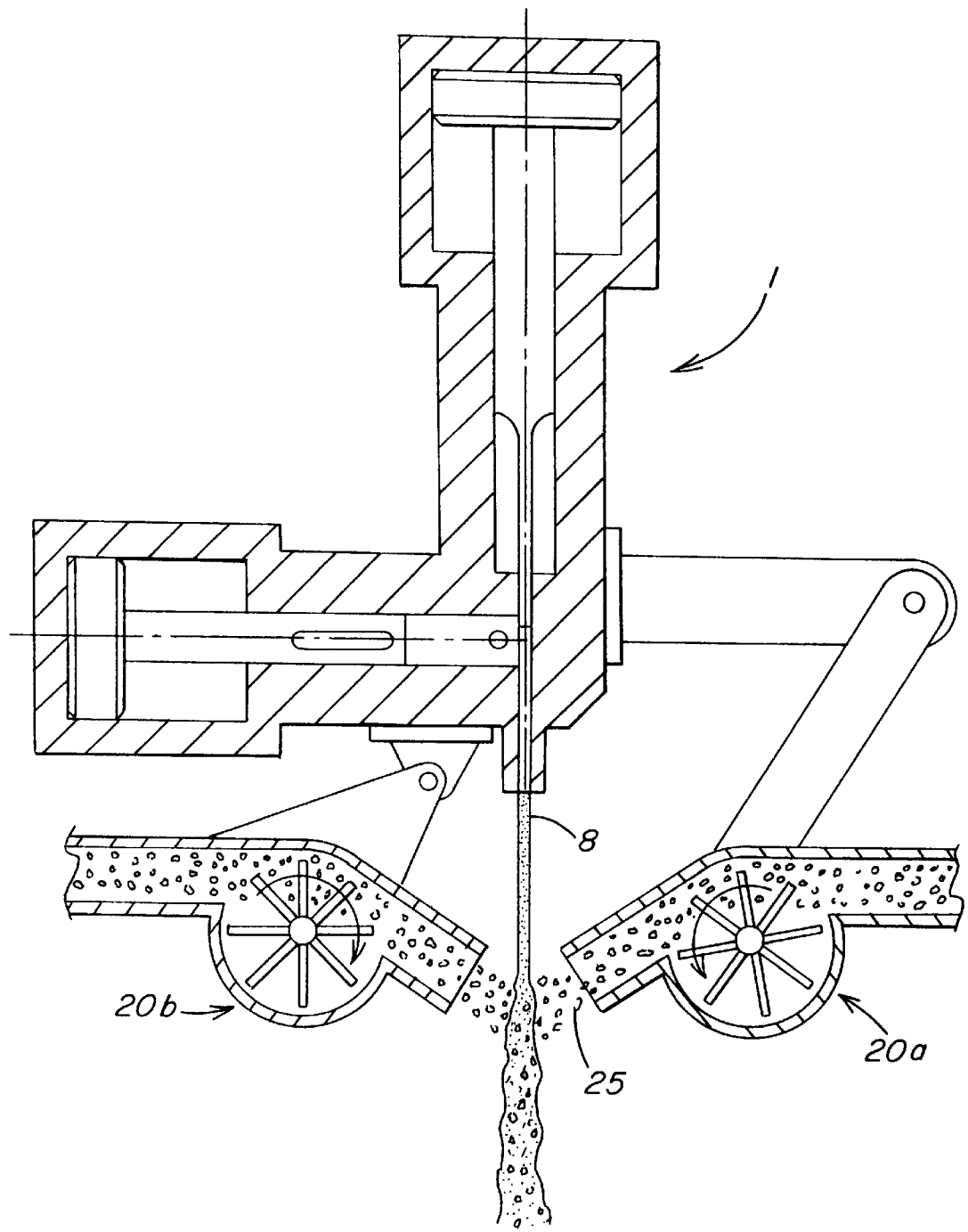
FIG. 6 shows another device for the production of filled multi-component plastics.

FIG. 6 shows a device which is analogous to FIG. 5, wherein solid particles 25, for example exfoliated graphite, are impelled against the liquid curtain 8 by means of impellers 20a and 20b. The impellers may have a peripheral speed from 1 to 50 m/s.

We claim:

1. A high-pressure mixing head for mixing at least two reactive plastic components, containing a mixing chamber, into which there lead two injection nozzles arranged opposite one another for the components, a proportioning piston which is displaceable in the mixing chamber and a settling and outflow chamber with a cleaning slide extending substantially perpendicular to the axis of the mixing chamber, characterized in that the settling chamber and the cleaning slide have a substantially rectangular cross-section with an axial ratio from 10 to 100, wherein the axial ratio is defined as the ratio of the width of the settling chamber and the cleaning slide to the thickness of the settling chamber and the cleaning slide.

2. A high-pressure mixing head according to claim 1, wherein the dimension of the settling chamber at right angles to the axis of the mixing chamber is 2 to 8 times greater than the diameter of the mixing chamber.

3. A process for the production of solid-filled two-component plastics using a high pressure mixing head according to claim 1, wherein the components are mixed in the high-pressure mixing head and the resulting component mixture is settled in the settling chamber after a substantially right-angled change of direction of the flow, characterized in that the component mixture in the settling chamber is guided by the substantially rectangular cross-section having an axial ratio from 10 to 100 and in that solid particles are brought into contact with the component mixture in free-flowing manner after said mixture has emerged from the settling chamber.

4. A process according to claim 3, wherein said solid particles are glass fibers which are supplied in the form of a glass-fiber hank and are conveyed and cut by means of transport rollers and cutting rollers having a peripheral speed from 1 to 50 m/s and are impelled against the free-flowing component mixture.

5. A process according to claim 3, wherein said solid particles are exfoliated graphite.

6. A process according to claim 3, wherein the free-flowing plastic mixture is brought into contact with solid particles on both sides.

* * * * *